(12) United States Patent
Park et al.

(10) Patent No.: US 11,696,261 B2
(45) Date of Patent: Jul. 4, 2023

(54) APPARATUS AND METHOD FOR RESOURCE ALLOCATION USING MOBILE BASE STATION

(71) Applicants: AGENCY FOR DEFENSE DEVELOPMENT, Daejeon (KR); INDUSTRY-UNIVERSITY COOPERATION FOUNDATION HANYANG UNIVERSITY ERICA CAMPUS, Ansan-si (KR)

(72) Inventors: Cheol Sun Park, Daejeon (KR); Sung Hyun Cho, Seoul (KR); Joo Han Park, Ansan-si (KR); Soo Hyeong Kim, Ansan-si (KR)

(73) Assignees: AGENCY FOR DEFENSE DEVELOPMENT, Daejeon (KR); INDUSTRY-UNIVERSITY COOPERATION FOUNDATION HANYANG UNIVERSITY ERICA CAMPUS, Ansan-si (KR)

( * ) Notice: Subject to any disclaimer, the term of this patent is extended or adjusted under 35 U.S.C. 154(b) by 105 days.

(21) Appl. No.: 17/383,913

(22) Filed: Jul. 23, 2021

(65) Prior Publication Data
US 2022/0030557 A1 Jan. 27, 2022

(30) Foreign Application Priority Data
Jul. 24, 2020 (KR) .................... 10-2020-0092343

(51) Int. Cl.
*H04W 72/04* (2023.01)
*H04W 24/08* (2009.01)

(52) U.S. Cl.
CPC .......... *H04W 72/04* (2013.01); *H04W 24/08* (2013.01)

(58) Field of Classification Search
CPC ..... H04W 72/04; H04W 24/08; H04W 16/32; H04W 52/0261; H04W 72/048;
(Continued)

(56) References Cited

U.S. PATENT DOCUMENTS 10,743,192 B2 8/2020 Hwang et al.
2010/0302980 A1 12/2010 Ji et al.
(Continued)

FOREIGN PATENT DOCUMENTS

| JP | 2014-123939 A | 7/2014 |
|---|---|---|
| KR | 20080026461 A | 3/2008 |

(Continued)

OTHER PUBLICATIONS

Li et al., Wireless Power Transfer and Data Collection in Wireless Sensor Networks, Mar. 2018, IEEE Transactions on Vehicular Technology, vol. 67, No. 3, pp. 2686-2696 (Year: 2018).*

(Continued)

*Primary Examiner* — Said M Elnoubi
(74) *Attorney, Agent, or Firm* — Miles & Stockbridge P.C.

(57) ABSTRACT

The disclosure generally relates to techniques for efficiently allocating resources allocated from a macro base station by estimating the communication possibility of each sensor without direct communication with the sensor in a mobile base station. A method for resource allocation in a mobile base station may include detecting at least one sensor within a communicable range of the mobile base station, estimating a communication possibility of the sensor based on a message queue and a remaining battery level of the at least one sensor, receiving resource allocation from a macro base station based on the communication possibility, and allocating the allocated resource to the sensor.

15 Claims, 10 Drawing Sheets

(58) Field of Classification Search
CPC . H04W 88/08; H04W 24/02; H04W 72/0493; H04W 84/005; B64C 39/024; B64C 2201/122; Y02D 30/70
See application file for complete search history.

(56) References Cited

U.S. PATENT DOCUMENTS

| | | | |
|---|---|---|---|
| 2014/0106801 A1 | | 4/2014 | Tamizhmani et al. |
| 2020/0229206 A1* | | 7/2020 | Badic ............... H04W 40/22 |

FOREIGN PATENT DOCUMENTS

| | | | |
|---|---|---|---|
| KR | 20100128243 A | | 12/2010 |
| KR | 20130036832 A | | 4/2013 |
| KR | 20180105492 A | | 9/2018 |
| KR | 20190001779 A | | 1/2019 |
| KR | 20190131337 A | | 11/2019 |
| WO | 2017091011 A1 | | 6/2017 |
| WO | 2019133048 A1 | | 7/2019 |

OTHER PUBLICATIONS

Park et al., Low-Complexity Data Collection Scheme for UAV Sink Nodes in Cellular IoT Networks, May 2021, IEEE Transactions on Vehicular Technology, vol. 70, No. 5, pp. 4865-4879 (Year: 2021).*

Decision to Grant with English Translation dated Sep. 19, 2022 in corresponding application No. KR 10-2020-0092343.

Junhee Park et al., "UAV-Aided Wireless Powered Communication Networks: Trajectory Optimization and Resource Allocation and Resource Allocation for Minimum Throughput Maximization", IEEE Access, vol. 7, p. 134978-134991, Sep. 13, 2019.

Einar C. Santos et al., "A Simple Reinforcement Learning Mechanism for Resource Allocation in LTE-A Networks with Markov Decision Process and Q-Learning", arXiv, preprint arXiv:1709.09312, Sep. 27, 2017.

Kai Li et al., "Wireless Power Transfer and Data Collection in Wireless Sensor Networks", IEEE Transactions on Vehicular Technology, vol. 67, No. 3, pp. 2686-2697, Mar. 1, 2018.

Joohan Park et al., "Low-Complexity Data Collection Scheme for UAV Sink Nodes in Cellular IoT Networks", IEEE Transactions on Vehicular Technology, vol. 70, No. 5, pp. 4865-4879, Mar. 25, 2021.

Office Action dated Dec. 15, 2021, for corresponding Korean Application No. 10-2020-0092343.

Extended European Search Report dated Dec. 22, 2021 for corresponding European Application No. 21187177.7.

Kim Hyeon-Su et al., "Waveform Performance Analysis in Communication Under the Battlefield Situation Using UAV Base-Station", 2018 Korea Telecommunications Society Summer Comprehensive Academic Presentation, Department of Electrical and Electronic Engineering, Yonsei University, Nov. 6, 2018, with English translation, 10 pages.

* cited by examiner

FIG. 5

| Algorithm 1: SSCRN |
|---|
| 1  Initialize $L_H, L_X$ |
| 2  foreach *SN* do |
| 3      a new $k \in SN$ is in $R_{U\,AV}$  Initialize $L_k$ |
| 4  end |
| 5  while *Each t TTI* do |
| 6      $L(t \mid B) = 0$ |
| 7      $K = NONE$ |
| 8      foreach $k \in R_{U\,AV}$ do |
| 9         if *Channel non-empty* then |
| 10            Update the $L_k(t)$ with $L_H$ |
| 11        else |
| 12            Update the $L_k(t)$ with $L_X$ |
| 13        end |
| 14        If $L(t \mid B) < L_k(t \mid B)$ then |
| 15            $L(t \mid B) = L_k(t \mid B)$ |
| 16        End |
| 17        $K = k$ |
| 18     end |
| 19     *K* is a highest likelihood sensor |
| 20 end |

FIG. 6

| Algorithm 2: Auction based game theoretic UAV selection |
|---|
| Input : $j \in UE$ scheduled at TTI $t$ |
| Output : $i \in UAV$ with the largest $bid_i(t)$ |
| 1  foreach $i \in UAV$ do |
| 2     Update Lielihood vector $L_k(t)$ by Algorithm 1 |
| 3     foreach $k \in SN$ do |
| 4        if $\arg\max_{s \in \{A,B,C\}} (L_k(t).s) = B$ then |
| 5           $cnt_B \leftarrow cnt_B + 1$ |
| 6        else |
| 7           $cnt_B \leftarrow cnt_{NB} + 1$ |
| 8        end |
| 9     end |
| 10    $u_{d,i}(t) \leftarrow \frac{cnt_B}{cnt_B + cnt_{NB}}$ , $u_{e,i}(t) \leftarrow \frac{cnt_{NB}}{cnt_B + cnt_{NB}}$ |
| 11    Calculate the bidding price of UAV $i$ as follows : $$bid_i(t) \leftarrow \frac{u_{d,i}(t)}{P_{i,j,RSS} + c} - u_{c,i}(t) \cdot P_{i,j,RSS}$$ |
| 12    if $bid_i(t) < bid_{th}$ then |
| 13        $bid_i(t) \leftarrow -\infty$ |
| 14    end |
| 15 end |
| 16 $i = \arg\max_{i \in CH}(bid_i(t))$ |

APPARATUS AND METHOD FOR RESOURCE ALLOCATION USING MOBILE BASE STATION

CROSS-REFERENCE TO RELATED APPLICATION(S)

This application claims the benefit of Korean Patent Application No. 10-2020-0092343, filed on Jul. 24, 2020, in the Korean Intellectual Property Office, the disclosure of which is incorporated herein by reference in its entirety.

BACKGROUND OF THE INVENTION

1. Field of the Invention

Example embodiments relate to a resource allocation technology using a mobile base station, and more particularly, to a technology capable of transmitting and receiving data by allocating resources to a sensor using a mobile base station sharing a channel with a macro base station.

2. Description of the Related Art

Mobile base stations, such as drones, are being applied to small cell technology for network recovery or traffic distribution in a network disconnection situation. Compared with existing base stations, the mobile base station as described herein improves the communication quality by forming a LINE-OF-SIGHT (LOS) communication link. In addition, since data may be transmitted and received at a short distance compared to the existing base stations, energy efficiency of user equipment (UE) may be improved.

However, due to the characteristics of the mobile base station operating on a battery, the mobile base station cannot be operated indefinitely or for a long time duration. To this end, a technology capable of maximizing the battery life of the mobile base station has been the subject of conventional research.

However, in the related art for maximizing the battery life of the mobile base station, it may be difficult to efficiently allocate resources when providing communication services through various devices such as vehicle communication and wireless sensor networks as well as cell phones. This is because energy efficiency of the sensor is important in the case of various sensors that have a limited battery capacity and are not easily charged, unlike a mobile phone with a large battery capacity and easy charging. Accordingly, there is a need for a technique for allocating resources in consideration of the energy efficiency of the sensor in the mobile base station.

SUMMARY OF THE INVENTION

Accordingly, the present invention is directed to an apparatus and method for resource allocation using the mobile base station that substantially obviates one or more problems due to limitations and disadvantages of the related art.

An aspect provides a technology that transmits and receives data by allocating resources to a sensor in consideration of the energy efficiency of the sensor using a mobile base station that shares a channel with a macro base station. The technical aspects of example embodiments are not limited to those mentioned above, and other aspects can be readily understood from the following example embodiments.

According to an aspect, there is provided a method for resource allocation in a mobile base station including detecting at least one sensor within a communicable range of the mobile base station, estimating a communication possibility of the sensor based on a message queue and a remaining battery level of the at least one sensor, receiving resource allocation from a macro base station based on the communication possibility, and allocating the allocated resource to the sensor.

The at least one sensor in the communicable range of the mobile base station may correspond to at least one of a first state, a second state, and a third state; and the allocating of the resource to the sensor may include allocating, by the mobile base station, the resource to a sensor having a higher probability of corresponding to the second state than the first state and the third state.

The estimating of the communication possibility of the sensor may include estimating the communication possibility based on a steady state probability based on a Markov chain and updating the communication possibility using different transition probabilities depending on whether a macro user communicates with the macro base station using the resource.

The receiving of the resource allocation from the macro base station may include receiving the resource allocation from the macro base station based on a number of the at least one sensor corresponding to the second state in the communicable range and a signal strength by a macro user.

The estimating of the communication possibility of the sensor based on the message queue and the remaining battery level of the at least one sensor may include estimating the communication possibility of the sensor based on whether a packet exists in the message queue and whether the remaining battery level is equal to or greater than a reference value required for transmission of the packet.

The mobile base station may detect a signal transmitted by a macro user every resource allocation period and may update the communication possibility of the sensor every resource allocation period.

The allocating of the resource to the sensor may include allocating the resource to the sensor having the highest probability of corresponding to the second state when there are a plurality of sensors having a higher probability of corresponding to the second state than the first state and the third state.

The first state may correspond to a case in which the remaining battery level of the sensor is greater than or equal to a reference value but there are no packets in the message queue, the second state may correspond to a case in which the remaining battery level of the sensor is greater than or equal to the reference value and there exists a packet in the message queue, and the third state may correspond to a case in which the remaining battery level is less than the reference value regardless of the message queue.

According to another aspect, there is provided a mobile base station including a communication device, a memory configured to store at least one instruction, and a processor configured to execute the at least one instruction to detect at least one sensor within a communicable range of the mobile base station, estimate a communication possibility of the sensor based on a message queue and a remaining battery level of the at least one sensor, and allocate a resource allocated from a macro base station to the sensor based on the communication possibility.

According to another aspect, there is provided a non-transitory computer-readable recording medium including a medium configured to store computer-readable instructions.

The computer-readable instructions may cause a processor, when executed by the processor, to perform a method for resource allocation including detecting at least one sensor within a communicable range of a mobile base station, estimating a communication possibility of the sensor based on a message queue and a remaining battery level of the at least one sensor, receiving resource allocation from a macro base station based on the communication possibility, and allocating the allocated resource to the sensor.

According to the example embodiments of the present invention, there are one or more of the following effects.

First, even if a mobile base station does not communicate with a sensor within a communicable range or a neighboring mobile base station, the channel use efficiency of the wireless sensor network is increased by estimating the communication possibility of the sensor.

Second, the efficiency of the resource allocated to the mobile base station from the macro base station is increased without additional workload in relation to resource allocation.

Third, by allocating resources in consideration of the energy efficiency of the sensor, the communication service is efficiently provided by being applied to various sensors that have limited battery capacity and are not easy to charge.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 5 illustrates an example of an algorithm for updating the communication possibility of a sensor according to an example embodiment;

FIG. 6 shows an example of an algorithm for selecting a mobile base station to allocate resources in a macro base station based on an auction theory according to an example embodiment;

DETAILED DESCRIPTION OF THE INVENTION

Reference will now be made in detail to the embodiments of the present invention, examples of which are illustrated in the accompanying drawings. Wherever possible, like reference numbers will be used for like elements.

The terms used in the example embodiments have been selected as general terms that are currently widely used as possible while taking functions in the present disclosure into consideration, but these may vary according to the intention of those of ordinary skill in the art, a precedent, the emergence of new technologies, and the like. In addition, in certain cases, there are terms arbitrarily selected by the applicant, and in this case, the meaning will be described in detail in the corresponding description. Therefore, the terms used in the present disclosure should be defined based on the meaning of the term and the whole contents of the present disclosure, not just the name of the term.

Throughout the specification, when it is stated that a part "includes" a certain component, it means that other components may be further included, and it does not preclude other components, unless otherwise stated. In addition, terms such as " . . . unit", " . . . module" described in the specification mean a unit for performing at least one function or operation, which may be implemented as hardware or software, or as a combination of hardware and software.

Throughout the specification, expression "at least one of a, b, and c" may include 'a only', 'b only', 'c only', 'a and b', 'a and c', 'b and c', or 'all of a, b, and c'.

The "terminal" mentioned below may be implemented as a computer or a portable terminal that can access a server or other terminal through a network. Here, the computer includes, for example, a notebook, a desktop, a laptop, and the like, equipped with a web browser, and the portable terminal is, for example, a wireless communication device that guarantees portability and mobility, which may include all kinds of handheld-based wireless communication device including communication-based terminals such as IMT (International Mobile Telecommunication), CDMA (Code Division Multiple Access), W-CDMA (W-Code Division Multiple Access), LTE (Long Term Evolution), smartphones, tablet PCs, or the like.

Example embodiments of the present disclosure will be described in detail with reference to the accompanying drawings so that those skilled in the art may easily implement the present disclosure. However, the present disclosure may be implemented in various different forms and is not limited to the example embodiments described herein.

Hereinafter, example embodiments of the present disclosure will be described in detail with reference to the drawings.

Figure 1:
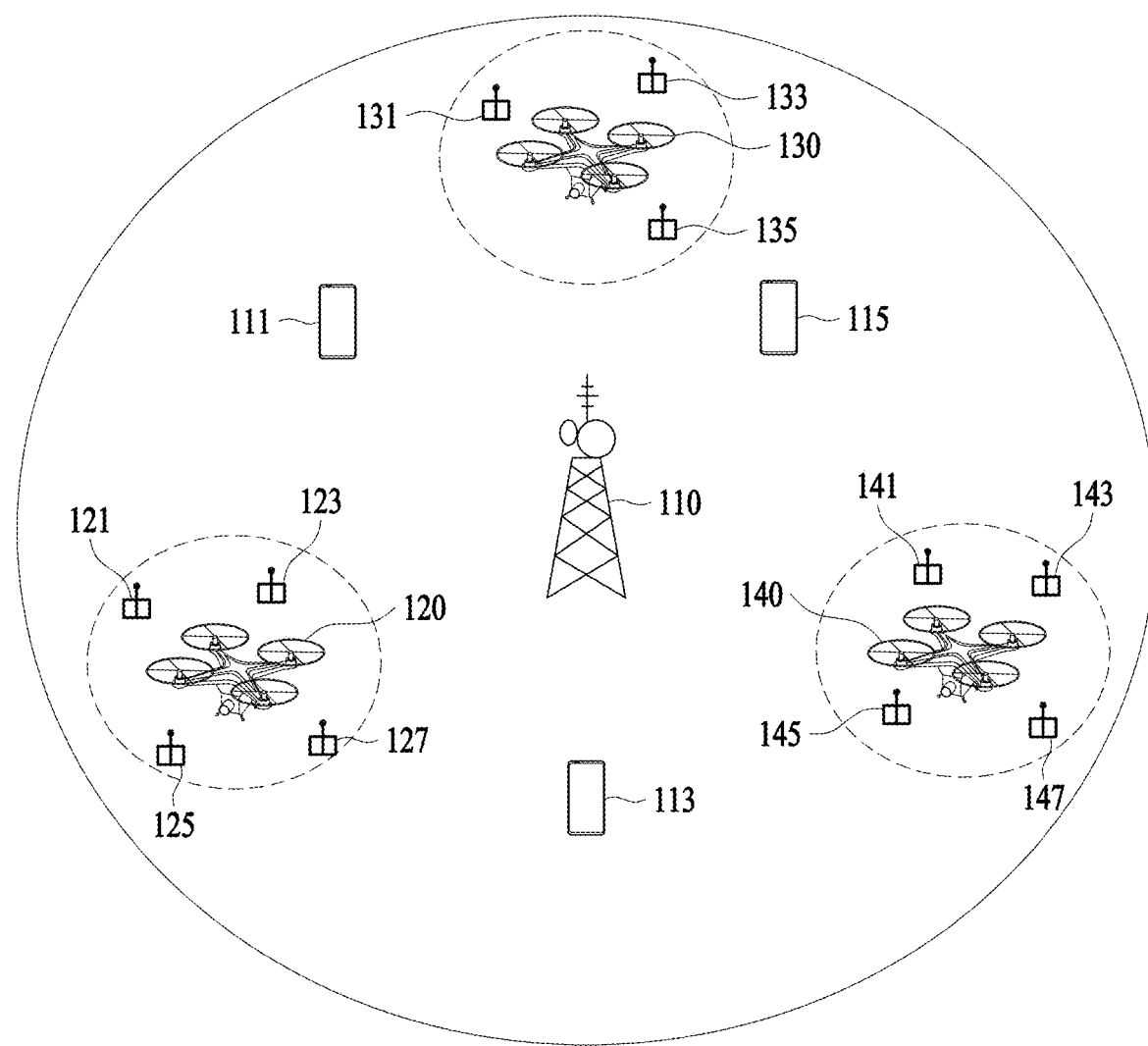
FIG. 1 is a diagram illustrating a system including a macro base station and a mobile base station according to an example embodiment.

FIG. 1 is a diagram illustrating a system including a macro base station and a mobile base station according to an example embodiment.

A macro base station 110 may perform wireless communication with macro users 111, 113 and 115 within a certain radius. Here, wireless communication may be, for example, GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), IrDA (Infrared Data Association), ZigBee, NFC (Near Field Communication), but is not limited thereto.

A mobile base station 120 may perform wireless communication with sensors 121, 123, 125 and 127 within a communicable range. In addition, a mobile base station 130 may perform wireless communication with sensors 131, 133 and 135 within a communicable range. In addition, a mobile base station 140 may perform wireless communication with sensors 141, 143, 145 and 147 within a communicable range. Here, the mobile base station is a base station that can move, and may include, for example, a drone. The sensor may charge the battery through energy harvesting when there is a signal transmitted from a macro user, and may discharge power when there is no signal transmitted from any macro user.

The mobile base stations 120, 130 and 140 may receive resource allocation from the macro base station 110, and the mobile base station may reallocate the allocated resource to a sensor within the communicable range. Specifically, when a certain condition is satisfied, the mobile base station among at least one mobile base station may be allocated a resource from the macro base station, and the mobile base station may reallocate the allocated resource to a sensor within the communicable range. Accordingly, the sensor may transmit data to the mobile base station using a communication link formed using the resource. For example, the macro base station 110 may allocate a resource to the mobile base station 120 satisfying a certain condition among the mobile base stations 120, 130 and 140, and the mobile base station 120 may allocate the resource to the sensor 123 among the sensors 121, 123, 125 and 127 within the communicable range in consideration of communication possibility related to the second state. A detailed process in which the macro base station allocates resources to the mobile base station and a detailed process in which the mobile base station allocates resources to the sensor will be described in detail below.

Figure 2:
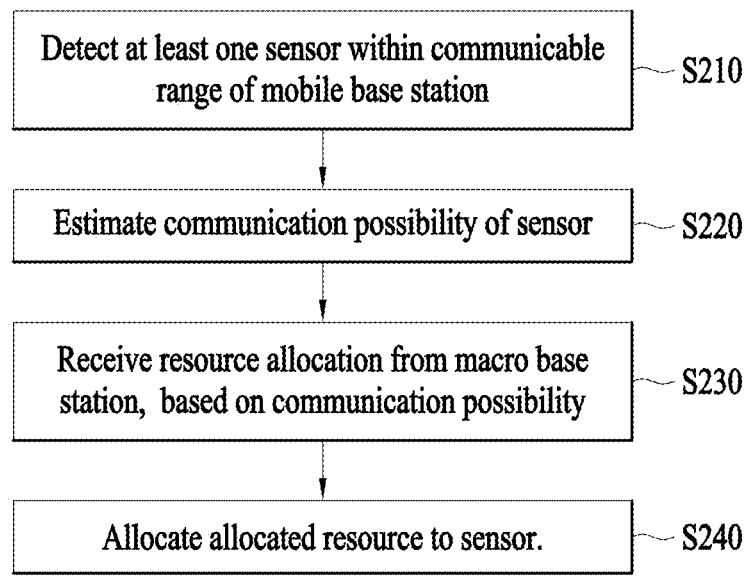
FIG. 2 is a diagram illustrating a resource allocation method performed by a mobile base station according to an example embodiment.

FIG. 2 is a diagram illustrating a resource allocation method performed by a mobile base station according to an example embodiment.

In operation 5210, the mobile base station may detect at least one sensor within a communicable range. The mobile base station may detect at least one sensor within the communicable range to allocate resources to form a communication link. For example, mobile base station 1 may detect sensor 1, sensor 2, and sensor 3 that are within the communicable range, and mobile base station 2 may detect sensor a, sensor b, and sensor c that are within the communicable range.

In operation 5220, the mobile base station may estimate a communication possibility of the sensor based on a message queue and a remaining battery level of the at least one sensor. Details of operation 5220 will be described with reference to FIGS. 3 and 4 below.

The communication possibility may be determined based on a probability that the sensor corresponds to the second state. Specifically, when the probability that the sensor corresponds to the second state is high, the communication possibility of the sensor may be relatively high, and when the probability that the sensor corresponds to the second state is relatively low, the communication possibility of the sensor may be low. For example, mobile base station 1 may determine the probabilities that the sensors correspond to the first state, the second state, or the third state, based on the message queues and the remaining battery levels of sensor 1, sensor 2 and sensor 3, based on the Markov chain. At this time, when the probabilities that sensor 1 and sensor 2 correspond to the second state is higher than those of the first state and the third state, the communication possibilities of sensor 1 and sensor 2 may be high. Also, mobile base station 2 may determine the probabilities that the sensors correspond to the first state, the second state, or the third state, based on the message queues and the remaining battery levels of sensor a, sensor b, and sensor c, based on the Markov chain. At this time, when the probability that sensor b corresponds to the second state is higher than those of the first state and the third state, the communication possibility of sensor b may be high.

In addition, the mobile base station may update the communication possibility of the sensor every resource allocation period. A detailed description thereof will be described in other drawings below.

In operation 5230, the mobile base station may be allocated a resource from the macro base station based on the communication possibility. The mobile base station may detect a signal transmitted by a macro user every resource allocation period.

The mobile base station 120 may estimate the communication possibility of the sensor within the communicable range by estimating the message queue and the remaining battery level. The sensor may correspond to at least one of the first state, the second state, and the third state, and the mobile base station may allocate the sensor the resource allocated from the macro base station in consideration of the communication possibility related to the second state.

Specifically, the mobile base station may set and transmit bidding information to the macro base station based on the number of sensors with high probabilities of corresponding to the second state in the communicable range and the reception strength of a signal transmitted by the macro user, and the macro base station may allocate resources by obtaining the bidding information from at least one mobile base station. The macro base station and the mobile base station may perform wireless communication with the macro user and the sensor while sharing a channel. For example, the channel between the macro base station and the macro user and the channel between the mobile base station and the sensor may be the same channel. Due to the channel sharing situation, the mobile base station may be affected by interference due to the signal transmitted by the macro user. That is, the mobile base station may be allocated resources from the macro base station in consideration of the remaining battery level and the presence of packets in the message queue of the sensor estimated by the mobile base station, and the influence of interference by the macro user.

For example, sensor 1 and sensor 2 included in mobile base station 1 may have the highest probabilities of corresponding to the second state, and sensor 3 may have the highest probability of corresponding to the first state. Mobile base station 1 may receive a relatively weak signal from the macro user. Also, sensor b included in mobile base station 2 may have the highest probability of corresponding to the second state, and sensor a and sensor c may have the highest probabilities of corresponding to the first state. Mobile base station 2 may receive a relatively strong signal from the macro user. Mobile base station 1 and mobile base station 2 may transmit related information to the macro base station, and the macro base station may allocate a corresponding channel to mobile base station 1 rather than mobile base station 2 based on the related information.

In operation 5240, the mobile base station may allocate the sensor the allocated resource. At this time, the mobile base station may allocate the corresponding resource to the sensor having the highest probability of corresponding to the second state among the sensors in the communicable range. For example, mobile base station 1 may be allocated a resource from the macro base station. Among the sensors in the communicable range of mobile base station 1, sensor 1 and sensor 2 may have relatively higher probabilities of corresponding to the second state than the first state and the third state. The probability of corresponding to the second state of sensor 1 may be 1/2, the probability of corresponding to the first state may be 1/4, and the probability of corresponding to the third state may be 1/4. Also, the probability of corresponding to the second state of sensor 2 may be 2/3, the probability of corresponding to the first state may be 1/6, and the probability of corresponding to the third state may be 1/6. Since sensor 1 and sensor 2 have higher probabilities of corresponding to the second state than the first state and the third state, but the probability of sensor 2 is relatively high, mobile base station 1 may allocate the resource to sensor 2. Accordingly, mobile base station 1 and sensor 2 may transmit/receive data using the established communication link.

Figure 3:
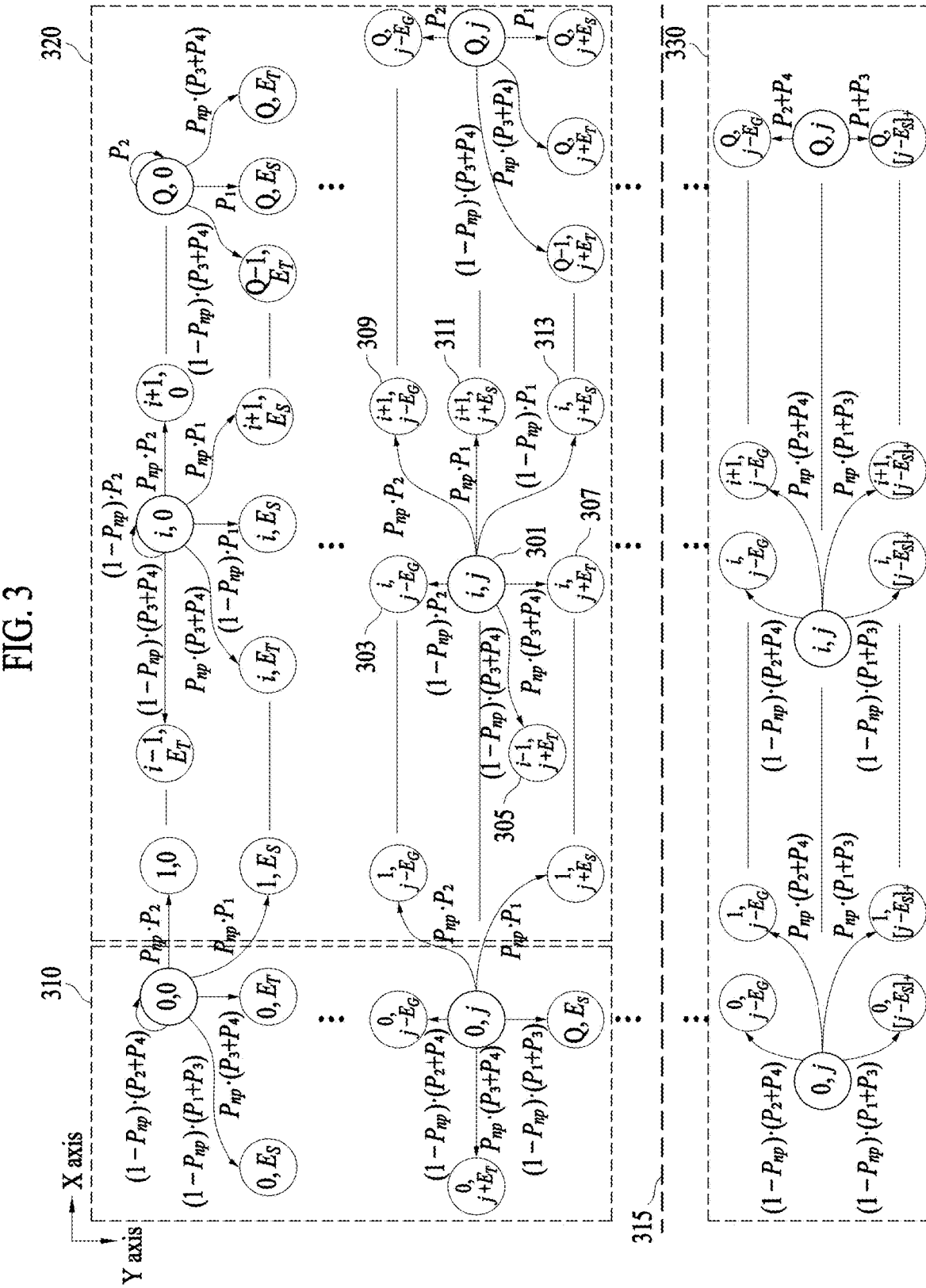
FIG. 3 illustrates a Markov chain determined based on the number of packets included in a message queue and a consumed battery amount, according to an example embodiment.

FIG. 3 illustrates a Markov chain determined based on the number of packets included in a message queue and a consumed battery amount, according to an example embodiment.

A mobile base station may estimate a communication possibility of a sensor using a Markov chain determined based on the number of packets included in the sensor's message queue and the amount of battery consumed. That is, the mobile base station can estimate the communication possibility of the sensor based on the Markov chain.

Each state of the Markov chain may be expressed in a two-dimensional form consisting of (i,j). At this time, the message queue of the sensor may include a maximum of Q packets, and is represented by the X-axis in FIG. 3. In addition, the consumed battery amount of the sensor is represented by the Y-axis in FIG. 3. For example, '0' may be a fully charged battery state and 'B' may be a fully discharged battery state. For example, state (i,j) 301 may indicate that i packets are included in the message queue of the sensor and the amount of consumed battery is j.

The transition probability between states may be composed of a combination of the number of the following four cases determined according to whether a macro user is scheduled and whether a sensor is scheduled, and the probability $P_{np}$ of generating a new packet. Here, whether the sensor consumes standby power may be determined according to whether the macro user is scheduled, and whether the packets are consumed may be determined according to whether the sensor is scheduled. A detailed description thereof will be given in other drawings below.

P1 may be a case where a sensor is not scheduled in a situation that a macro user is not scheduled. In this case, the sensor consumes standby power, and the sensor may not consume packets. P2 may be a case where a sensor is not scheduled in a situation that a macro user is scheduled. In this case, the sensor charges energy through energy harvesting, and the sensor may not consume packets. P3 may be a case where a sensor is scheduled in a situation that a macro user is not scheduled. In this case, the sensor consumes standby power, and the sensor may consume packets. P4 may be a case where a sensor is scheduled in a situation that a macro user is scheduled. In this case, the sensor charges energy through energy harvesting, and the sensor may consume packets.

If the number of macro users existing within the communicable range of the macro base station is $N_{UE}$, the number of sensors is $N_{SN}$, and the probability that the mobile base station corresponding to the sensor is allocated a resource is $P_{win}$, P1, P2, P3, and P4 are represented by the following Equation 1.

[Equation 1]

$$P_1 = \frac{1}{N_{UE}} \cdot (1 - P_{win}) + \frac{1}{N_{UE}} \cdot P_{win} \cdot \frac{N_{SN-1}}{N_{SN}}$$

$$P_2 = \frac{N_{UE} - 1}{N_{UE}} \cdot (1 - P_{win}) + \frac{N_{UE} - 1}{N_{UE}} \cdot P_{win} \cdot \frac{N_{SN} - 1}{N_{SN}}$$

$$P_3 = \frac{1}{N_{UE}} \cdot P_{win} \cdot \frac{1}{N_{SN}}$$

$$P_4 = \frac{N_{UE} - 1}{N_{UE}} \cdot P_{win} \cdot \frac{1}{N_{SN}}$$

Here, when a macro user is scheduled, the sensor can charge energy as much as $E_G$ through energy harvesting, or when the sensor fails to perform energy harvesting because there is no scheduled macro user, the sensor may consume standby power as much as $E_S$. In addition, when the sensor is scheduled, the sensor may consume the packet by transmitting the packet to the mobile base station, in which case the required amount of energy may be $E_T$.

For example, state (i,j) 301 may transition to state (i+1, j+$E_S$) 311 with a probability of $P_{np}$*P1 when a new packet is generated and the macro user and sensor are not scheduled. In addition, state (i,j) 301 may transition to state (i+1, j−$E_G$) 309 with a probability of $P_{np}$*P2 when a new packet is generated and the sensor is not scheduled in a situation that the macro user is scheduled. Also, state (i,j) 301 may transition to state (i, j+$E_S$) 313 with a probability of (1−$P_{np}$)*P1 when no new packet is generated and the macro user and sensor are not scheduled. Also, state (i,j) 301 may transition to state (i, j+$E_T$) 307 with a probability of $P_{np}$*(P3+P4) when a new packet is generated and the sensor is scheduled regardless of whether the macro user is scheduled or not. In addition, state (i,j) 301 may transition to state (i−1, j+$E_T$) 305 with a probability of (1−$P_{np}$)*(P3+P4) when a new packet is not generated and the sensor is scheduled regardless of whether the macro user is scheduled or not. In addition, state (i,j) 301 may transition to state (i, j−$E_G$) 303 with a probability of (1−$P_{np}$)*P2 when a new packet is not generated and the sensor is not scheduled in a situation that the macro user is scheduled.

At this time, by comparing the Y-axis value and B-$E_T$ in the Markov chain shown in FIG. 3, a state in which data cannot be transmitted to the mobile base station even when the sensor is scheduled may be determined. Specifically, in the case of the state below the line 315 in FIG. 3, even if the sensor is scheduled, the energy required for packet transmission is insufficient, and thus data cannot be transmitted to the mobile base station.

Figure 4:
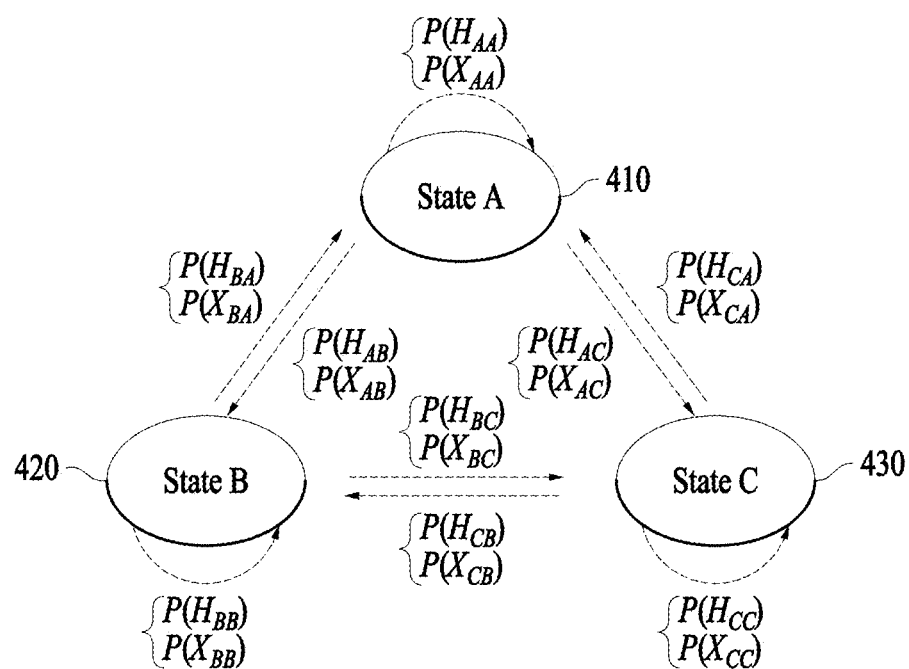
FIG. 4 shows a state diagram according to an example embodiment.

A set 330 of states may correspond to state C of FIG. 4, a set 310 of states may correspond to state A of FIG. 4, and a set 320 of states may correspond to state B of FIG. 4. Here, state A is a case where the sensor's remaining battery level is sufficient to transmit a packet, but there is no packet in the message queue. State B is a case where the sensor's remaining battery level is sufficient to send a packet and there is a packet in the message queue. In addition, state C is a case where the remaining battery level is insufficient to transmit data, regardless of whether there are packets in the message queue. For example, state (0, 0) corresponds to state A in FIG. 4. But, when a new packet is generated and the sensor is not scheduled in a situation that the macro user is scheduled, it may transition to state (1, 0) with a probability of $P_{np}*P2$, which is state B of FIG. 4. As another example, when it is transitioned from state (i,j) 301 to state (i, j+$E_T$) 307, it may be a case of transition from state B to state C where the remaining battery level is lower than the line 315 at state (i, j+$E_T$) 307.

FIG. 4 shows a state diagram according to an example embodiment.

The state diagram of FIG. 4 may be composed of three states based on the Markov chain. Since it is complicated to perform the B*Q calculation for each sensor as shown in FIG. 3, it may be modeled as the state diagram of FIG. 4 to reduce computational complexity.

State A 410 may be a case where the sensor's remaining battery level is sufficient to transmit a packet, but there is no packet in the message queue. Specifically, state A 410 may correspond to the first state in which the remaining battery level of the sensor is above the reference value sufficient to transmit the packet, but no packet is present in the message queue. Also, state B 420 may be a case where the remaining battery level of the sensor is sufficient to transmit the packet and the packet is present in the message queue. Specifically, state B 420 may correspond to the second state in which the remaining battery level of the sensor is above the reference value sufficient to transmit the packet and the packet exists in the message queue. Also, state C 430 may be a case where the remaining battery level is insufficient to transmit data regardless of whether a packet is present in the message queue. Specifically, state C 430 may correspond to the third state in which the remaining battery level is less than the reference value, which is insufficient to transmit data regardless of whether a packet is present in the message queue.

The set 310 of states in FIG. 3 may correspond to state A, the set 320 of states in FIG. 3 may correspond to state B, and the set 330 of states in FIG. 3 may correspond to state C.

Here, the initial communication possibilities of the sensors corresponding to state A, state B, and state C may be estimated based on the steady-state probability based on the Markov chain. The steady state probability based on the Markov chain can represent the probability that the message queue or battery state of a specific sensor is in the corresponding state when sufficient time has elapsed. Specifically, the initial communication possibility of the sensor corresponding to state A may be determined as the sum of the steady state probabilities of the states corresponding to the set 310 of states. Also, the initial communication possibility of the sensor corresponding to state B may be determined as the sum of the steady state probabilities of the states corresponding to the set 320 of states. Also, the initial communication possibility of the sensor corresponding to state C may be determined as the sum of the steady state probabilities of the states corresponding to the set 330 of states. For example, the sum of probabilities corresponding to the set 320 of states when sufficient time has elapsed may be the initial communication possibility of state B. Here, the sum of the initial communication possibility corresponding to state A, the initial communication possibility corresponding to state B, and the initial communication possibility corresponding to state C may be 1. For example, if the probability that the sensor is in state A is $P_A$, the probability that it is in state B is $P_B$, and the probability that it is in state C is $P_C$, then $P_A+P_B+P_C=1$.

Depending on whether a macro user communicates with the macro base station using the resource, the communication possibility may be updated using different transition probabilities. Specifically, P(H) may be a transition probability used when a channel is occupied by the macro user, and P(X) may be a transition probability used when a channel is not occupied by the macro user.

For example, $P(H_{AA})$ may be the transition probability of being updated from state A to state A when the channel is occupied by the macro user, and $P(X_{AA})$ may be the transition probability of being updated from state A to state A when the channel is not occupied by the macro user. Also, $P(H_{BB})$ may be the transition probability of being updated from state B to state B when the channel is occupied by the macro user, and $P(X_{BB})$ may be the transition probability of being updated from state B to state B when the channel is not occupied by the macro user. Also, $P(H_{CC})$ may be the transition probability of being updated from state C to state C when the channel is occupied by the macro user, and $P(X_{CC})$ may be the transition probability of being updated from state C to state C when the channel is not occupied by the macro user. For another example, $P(H_{BA})$ may be the transition probability of being updated from state B to state A when the channel is occupied by the macro user, and $P(X_{BA})$ may be the transition probability of being updated from state B to state A when the channel is not occupied by the macro user. For another example, $P(H_{AB})$ may be the transition probability of being updated from state A to state B when the channel is occupied by the macro user, and $P(X_{AB})$ may be the transition probability of being updated from state A to state when the channel is not occupied by the macro user. For another example, $P(H_{BC})$ may be the transition probability of being updated from state B to state C when the channel is occupied by the macro user, and $P(X_{BC})$ may be the transition probability of being updated from state B to state C when the channel is not occupied by the macro user. For another example, $P(H_{CB})$ may be the transition probability of being updated from state C to state B when the channel is occupied by the macro user, and $P(X_{CB})$ may be the transition probability of being updated from state C to state B when the channel is not occupied by the macro user. For another example, $P(H_{AC})$ may be the transition probability of being updated from state A to state C when the channel is occupied by the macro user, and $P(X_{AC})$ may be the transition probability of being updated from state A to state C when the channel is not occupied by the macro user. For another example, $P(H_{CA})$ may be the transition probability of being updated from state C to state A when the channel is occupied by the macro user, and $P(X_{CA})$ may be the transition probability of being updated from state C to state A when the channel is not occupied by the macro user.

At this time, since the sensor cannot transition from state B to state C while performing energy harvesting, $P(H_{BC})$ may be zero. Also, since the sensor cannot transition from state C to state B while consuming standby power, $P(X_{CB})$ may be zero. Also, since the sensor cannot transition from state A to state C while performing energy harvesting, $P(H_{AC})$ may be zero. Also, since the sensor cannot transition from state C to state A while consuming standby power, $P(X_{CA})$ may be zero.

FIG. 5 illustrates an example of an algorithm for updating communication possibility of a sensor according to an example embodiment.

Here, $L_H$ may be a probability of updating communication possibility when charging is possible through energy harvesting, and $L_X$ may be a probability of updating communication possibility when a battery is consumed. Also, $L_K$ may be the current communication possibility of sensor K. Every resource allocation period (TTI), the mobile base station may update the communication possibility of the sensor.

Specifically, the mobile base station may update the probability for each state of the sensor every resource allocation period. First, the mobile base station may detect a sensor existing in a communicable range. The mobile base station may establish an initial communication possibility for the detected sensor.

If the channel is occupied by a macro user, the mobile base station can use the $L_H$ to update the communication possibilities of the sensors. In addition, when the channel is not occupied by a macro user, the mobile base station can update the communication possibilities of the sensors using the $L_X$.

The mobile base station may select a sensor with the highest probability of state B among sensors within a communicable range. When the mobile base station receives resource allocation from the macro base station, a communication link between the mobile base station and the sensor may be formed by allocating the resource to the sensor having the highest probability of state B.

For example, sensor 1, sensor 2, and sensor 3 may exist within the communicable range of the mobile base station. The mobile base station may estimate that the probability that sensor 1 corresponds to state A is 1/4, the probability that it corresponds to state B is 1/4, and the probability that it corresponds to state C is 1/2. Also, the mobile base station may estimate that the probability that sensor 2 corresponds to state A is 1/6, the probability that it corresponds to state B is 2/3, and the probability that it corresponds to state C is 1/6. Also, the mobile base station may estimate that the probability that sensor 3 corresponds to state A is 1/4, the probability that it corresponds to state B is 1/2, and the probability that it corresponds to state C is 1/4. Therefore, the mobile base station can select sensor 2 with the highest probability of state B, and when a resource is allocated from the macro base station, the mobile base station allocates the resource to sensor 2, and a communication link between sensor 2 and the mobile base station is formed.

FIG. 6 shows an example of an algorithm for selecting a mobile base station to allocate resources in a macro base station based on an auction theory according to an example embodiment.

At least one mobile base station (ex: UAV) included in the macro base station may be allocated resources based on the auction theory. Specifically, for a channel that the macro base station can allocate, at least one mobile base station determines the value of the channel and transmits it to the macro base station. The macro base station may allocate the corresponding channel to the mobile base station that offered the highest value.

The mobile base station may set the value $V_d$ for the channel based on the auction theory every resource allocation period. The mobile base station may identify the number of sensors having the highest probability for the second state among sensors within its communicable range. For example, sensor 1, sensor 2, sensor 3, and sensor 4 may be included in the communicable range of the mobile base station. At this time, sensor 1 has the highest probability for the first state, sensor 2 has the highest probability for the second state, sensor 3 has the highest probability for the third state, and sensor 4 has the highest probability for the second state. The mobile base station may identify sensor 2 and sensor 4 with the highest probabilities for the second state. At this time, the mobile base station may set the value $V_d$ by dividing the number of sensors with the highest probabilities for the second state by the number of sensors within its communicable range. For example, the mobile base station may set the value $V_d$ to 2/4 by dividing the number of sensors with the highest probabilities for the second state by the number of sensors within its communicable range. This is in consideration of a situation in which, when there are many sensors with the highest probabilities for the first state or the third state in the communicable range, the mobile base station does not need to be allocated a channel, and when there are many sensors with the highest probabilities for the second state, the mobile base station needs to be allocated a channel. Since the value $V_d$ of the mobile base station for the channel has a value between 0 and 1, the degree $V_e$ to which the mobile base station does not need the corresponding channel may be defined as $1-V_d$.

In addition, the mobile base station may use the strength of a signal transmitted by a macro user to reuse a frequency by minimizing interference from the macro user. The mobile base station may receive a signal transmitted by the macro user, and may measure the received signal strength (RSS). When the received strength of the signal transmitted by the macro user is relatively strong, it corresponds to a case where the distance between the macro user and the mobile base station is relatively close. When the received strength of the signal transmitted by the macro user is relatively weak, it corresponds to a case where the distance between the macro user and the mobile base station is relatively long. When the received strength of the signal transmitted by the macro user is 0, it may correspond to a case where the macro user does not transmit a signal in the corresponding resource allocation period.

Accordingly, as the value $V_d$ for the corresponding channel is high and the strength of the signal transmitted by the macro user is weak, the mobile base station may transmit high bidding information to the macro base station to receive the corresponding channel. Alternatively, as the value $V_d$ for the corresponding channel is low and the strength of the signal transmitted by the macro user is strong, the mobile base station transmits low bidding information to the macro base station and may not be allocated the corresponding channel.

The bidding information $bid_i(t)$ transmitted by the i-th mobile base station to the macro base station at time t is expressed by Equation 2 below.

[Equation 2]

$$bid_i(t) = \frac{v_{d,i}(t)}{rss} - v_{e,i}(t) \cdot rss$$

After receiving the bidding information from the mobile base stations every resource allocation period, the macro base station may allocate a channel to the mobile base station that offered the highest bidding information. At this time, the mobile base station to which the channel is allocated may form a communication link with the sensor by allocating the channel to the sensor having the highest probability for the second state. Accordingly, the sensor and the mobile base station can transmit and receive data using the communication link.

For example, mobile base station 1 may estimate a probability for the second state of at least one sensor existing within its communicable range, and may set a value $V_{d,1}$ for the corresponding channel. Mobile base station 1 may measure the received strength of a signal transmitted by a macro user. Based on this, mobile base station 1 may transmit bidding information 1 for the corresponding channel to the macro base station. In addition, mobile base station 2 may estimate a probability for the second state of at least one sensor existing within its communicable range, and may set a value $V_{d,2}$ for the corresponding channel. Mobile base station 2 may measure the received strength of a signal transmitted by a macro user. Based on this, mobile base station 2 may transmit bidding information 2 for the corresponding channel to the macro base station. Similarly, mobile base station N may transmit bidding information N for the corresponding channel to the macro base station. The macro base station may allocate the corresponding channel to mobile base station 2 that offered the highest bidding information among bidding information 1 to bidding information N. Mobile base station 2 may form a communication link with the sensor having the highest probability for the second state using the allocated channel. Accordingly, data may be transmitted from the sensor to mobile base station 2 using the communication link, and mobile base station 2 may transmit data to the macro base station.

Figure 7:
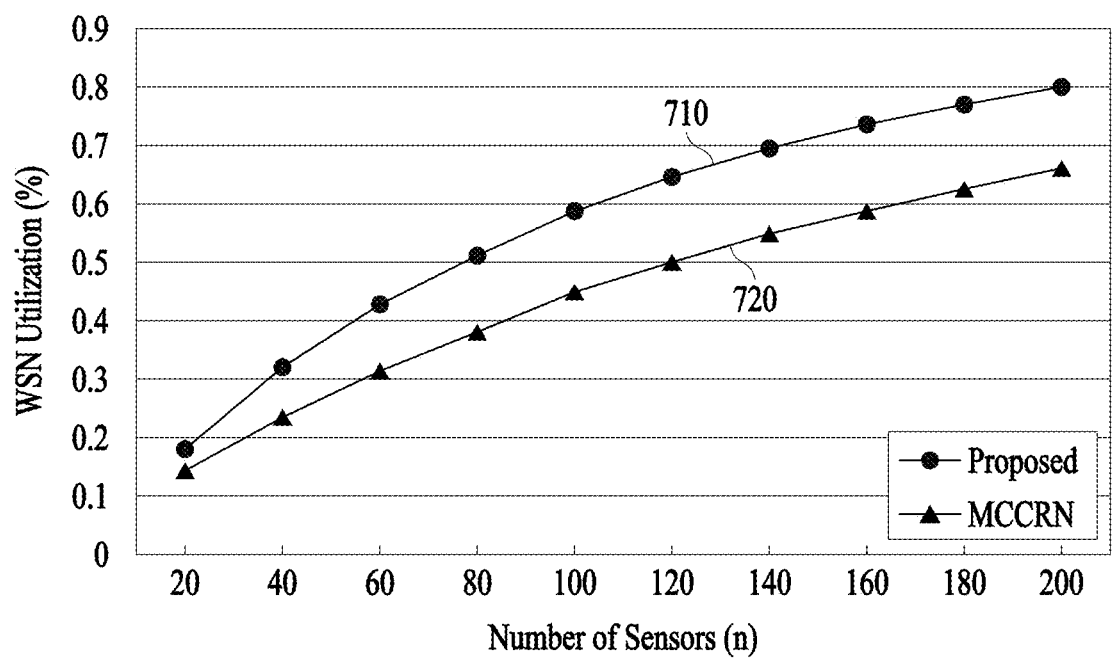
FIG. 7 illustrates the utilization of a wireless sensor network depending on the number of sensors according to an example embodiment.

FIG. 7 illustrates the utilization of a wireless sensor network depending on the number of sensors according to an example embodiment. Here, the utilization of the wireless sensor network may be a ratio of the number of times the mobile base station successfully schedules a communicable sensor and the total number of times the resource is allocated. Graph 710 shows the utilization of the wireless sensor network depending on the number of sensors according to the resource allocation method proposed in the present specification, and graph 720 shows the utilization of the wireless sensor network depending on the number of sensors according to the existing method. When the graph 710 and the graph 720 are compared, it may be seen that the utilization of the wireless sensor network is improved when the resource allocation method proposed in the present specification is used.

Figure 8:
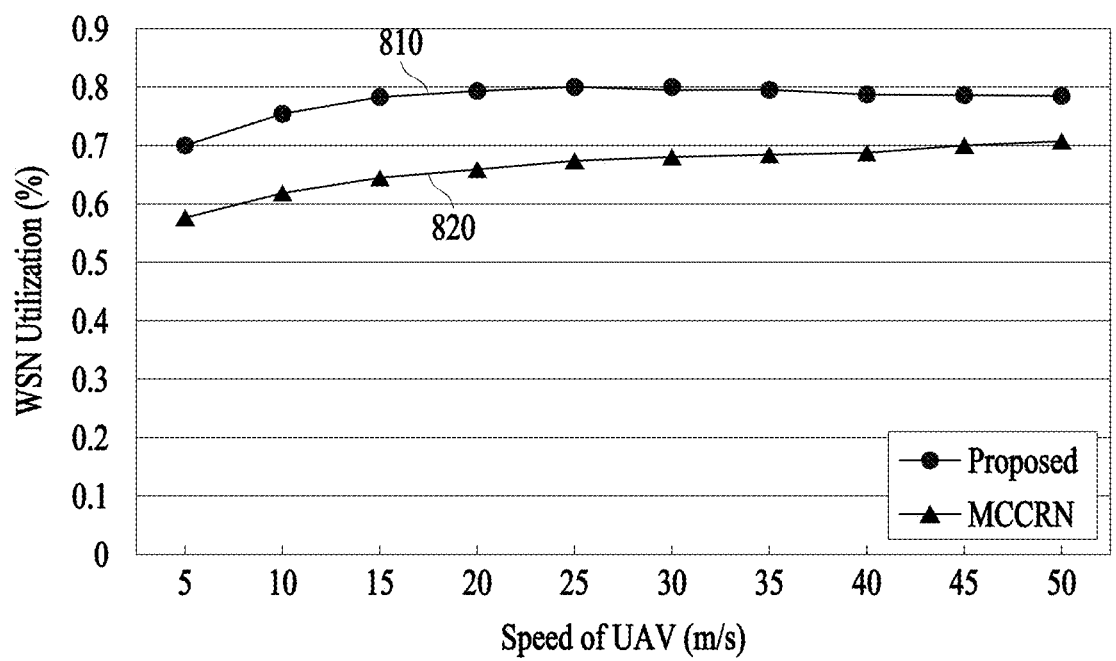
FIG. 8 shows the utilization of a wireless sensor network depending on the speed of the mobile base station according to an example embodiment.

FIG. 8 shows the utilization of a wireless sensor network depending on the speed of the mobile base station according to an example embodiment. Graph 810 shows the utilization of the wireless sensor network depending on the speed of the mobile base station according to the resource allocation method proposed in this specification, and graph 820 shows the utilization of the wireless sensor network depending on the speed of the mobile base station according to the existing method. When the graph 810 and the graph 820 are compared, it may be seen that the utilization of the wireless sensor network is improved when the resource allocation method proposed in the present specification is used.

Figure 9:
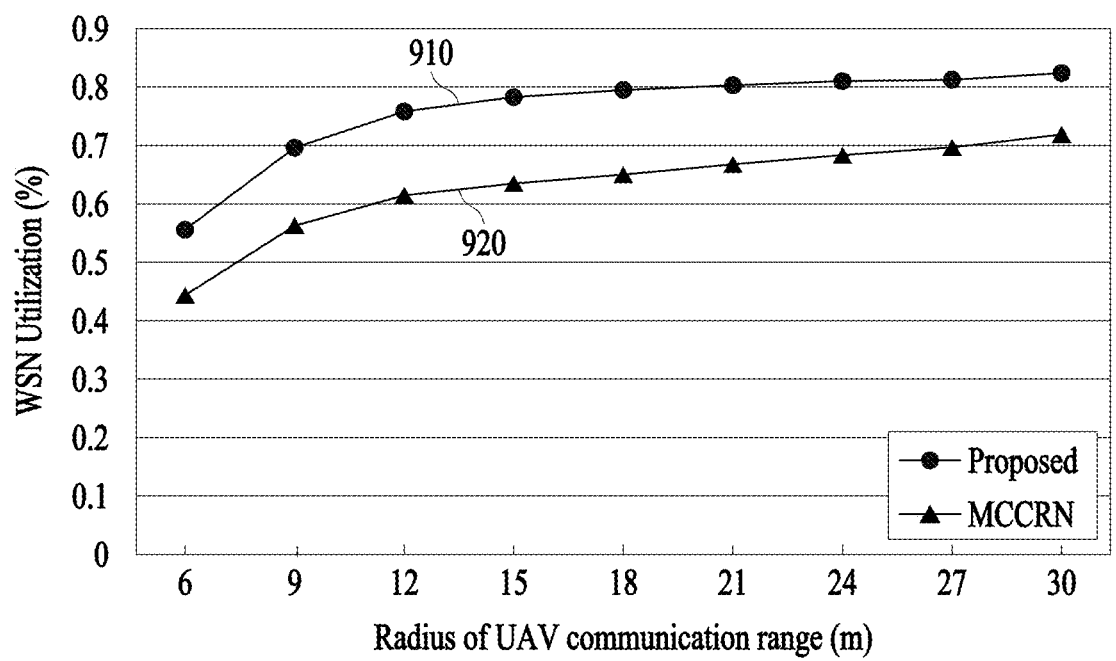
FIG. 9 illustrates the utilization of a wireless sensor network depending on the communicable range of the mobile base station according to an example embodiment.

FIG. 9 illustrates the utilization of a wireless sensor network depending on the communicable range of the mobile base station according to an example embodiment. Graph 910 shows the utilization of the wireless sensor network depending on the communicable range of the mobile base station according to the resource allocation method proposed in the present specification, and graph 920 shows the utilization of the wireless sensor network depending on the communicable range of the mobile base station according to the existing method. When the graph 910 and the graph 920 are compared, it may be seen that the utilization of the wireless sensor network is improved when the resource allocation method proposed in the present specification is used.

Figure 10:
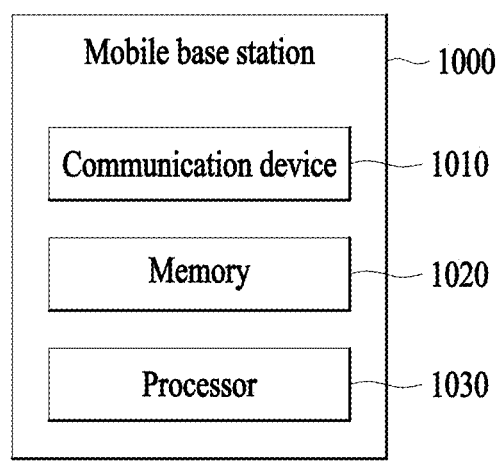
FIG. 10 is a block diagram of a mobile base station according to an example embodiment.

FIG. 10 is a block diagram of a mobile base station according to an example embodiment.

The mobile base station 1000 may include a communication device 1010, a memory 1020, and a processor 1030, according to an example embodiment. In the mobile base station 1000 shown in FIG. 10, only the components related to this example embodiment are shown. Accordingly, it is readily understood by those of ordinary skill in the art that other general-purpose components may be further included in addition to the components shown in FIG. 10. Since the mobile base station 1000 may include the above-described content related to the electronic apparatus, a description of overlapping content is omitted.

The communication device 1010 is a device for performing wired/wireless communication and may communicate with an external electronic apparatus. The external electronic apparatus may be a terminal or a server. In addition, communication technologies used by the communication device 1010 may include GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), IrDA (Infrared Data Association), ZigBee, NFC (Near Field Communication), and the like.

The processor 1030 may control overall operations of the mobile base station 1000 and process data and signals. The processor 1030 may be configured with at least one hardware unit. In addition, the processor 1030 may operate by one or more software modules generated by executing program codes stored in the memory 1020. The processor 1030 may execute program codes stored in the memory 1020 to control overall operations of the mobile base station 1000 and process data and signals.

The processor 1030 may detect at least one sensor within a communicable range of the mobile base station 1000 and estimate a state of the sensor based on a Markov chain. The processor 1030 may determine the value of the resource that may be allocated from the macro base station by using the estimated result. In addition, the processor 1030 may determine the bidding information for the corresponding channel based on the value and the received strength of signals transmitted by the macro users around. The processor 1030 may transmit the bidding information for the corresponding channel to the macro base station, and the macro base station may allocate the corresponding channel to the mobile base station that has transmitted the highest bidding information among at least one piece of bidding information. Accordingly, the mobile base station allocated the corresponding channel may form a communication link with the sensor having the highest second state using the corresponding channel, and may receive data from the sensor through the communication link.

The electronic apparatus or terminal according to the above-described example embodiments may include a processor, a memory for storing and executing program data, a permanent storage such as a disk drive, a communication port for communicating with an external device, a user interface device such as a touch panel, a key, a button, or the like. Methods implemented as software modules or algorithms may be stored on a computer-readable recording medium as computer-readable codes or program instructions executable on the processor. Here, the computer-readable recording medium includes a magnetic storage medium (e.g., ROM (read-only memory), RAM (random-Access memory), floppy disk, hard disk, etc.) and optical reading medium (e.g., CD-ROM and DVD (Digital Versatile Disc)). The computer-readable recording medium is distributed over networked computer systems, so that computer-readable codes may be stored and executed in a distributed manner. The medium is readable by a computer, stored in a memory, and executed on a processor.

The present example embodiment may be represented by functional block configurations and various processing steps. These functional blocks may be implemented with various numbers of hardware or/and software configurations that perform specific functions. For example, the example embodiment may employ an integrated circuit configuration such as memory, processing, logic, look-up table, or the like, capable of executing various functions by control of one or more microprocessors or other control devices. Similar to that components may be implemented with software programming or software elements, this example embodiment includes various algorithms implemented with a combination of data structures, processes, routines or other programming components and may be implemented with a programming or scripting language including C, C++, Java, assembler, etc. Functional aspects may be implemented with an algorithm running on one or more processors. In addition, the present example embodiment may employ known techniques for at least one of electronic environment setting, signal processing, and data processing. Terms such as "mechanism", "element", "means", and "composition" may be used in a broad sense, and are not limited to mechanical and physical configurations. Those terms may include the meaning of a series of routines of software in connection with a processor or the like.

It will be apparent to those skilled in the art that various modifications and variations may be made in the apparatus and method for resource allocation using the mobile base station of the present invention without departing from the spirit or scope of the invention. Thus, it is intended that the present invention cover the modifications and variations of this invention provided they come within the scope of the appended claims and their equivalents.

What is claimed is:

1. A method for resource allocation in a mobile base station, the method comprising:
    detecting at least one sensor within a communicable range of the mobile base station;
    estimating a communication possibility of the sensor based on a message queue and a remaining battery level of the at least one sensor;
    receiving resource allocation from a macro base station based on the communication possibility; and
    allocating the allocated resource to the sensor,
    wherein the estimating the communication possibility of the sensor based on the message queue and the remaining battery level of the at least one sensor includes:
    estimating the communication possibility of the sensor based on whether a packet exists in the message queue and whether the remaining battery level is equal to or greater than a reference value required for transmission of the packet.

2. The method for resource allocation of claim 1, wherein the at least one sensor in the communicable range of the mobile base station corresponds to at least one of a first state, a second state and a third state, and the allocating of the resource to the sensor includes allocating, by the mobile base station, the resource to a sensor having a higher probability of corresponding to the second state than the first state and the third state.

3. The method for resource allocation of claim 2, wherein the receiving of the resource allocation from the macro base station includes receiving the resource allocation from the macro base station based on a number of the at least one sensor corresponding to the second state in the communicable range and a signal strength by a macro user.

4. The method for resource allocation of claim 2, wherein the allocating of the resource to the sensor includes allocating the resource to the sensor having the highest probability of corresponding to the second state when there are a plurality of sensors having a higher probability of corresponding to the second state than the first state and the third state.

5. The method for resource allocation of claim 2, wherein the first state corresponds to a case in which the remaining battery level of the sensor is greater than or equal to a reference value but there are no packets in the message queue, the second state corresponds to a case in which the remaining battery level of the sensor is greater than or equal to the reference value and there exists a packet in the message queue, and the third state corresponds to a case in which the remaining battery level is less than the reference value regardless of the message queue.

6. The method for resource allocation of claim 1, wherein the estimating of the communication possibility of the sensor includes estimating the communication possibility based on a steady state probability based on a Markov chain and updating the communication possibility using different transition probabilities depending on whether a macro user communicates with the macro base station using the resource.

7. The method for resource allocation of claim 1, wherein the mobile base station detects a signal transmitted by a macro user every resource allocation period and updates the communication possibility of the sensor every resource allocation period.

8. A mobile base station comprising:
    a communication device;
    a memory configured to store at least one instruction; and
    a processor configured to execute the at least one instruction to detect at least one sensor within a communicable range of the mobile base station, estimate a communication possibility of the sensor based on a message queue and a remaining battery level of the at least one sensor, and allocate a resource allocated from a macro base station to the sensor based on the communication possibility,
    wherein the estimating the communication possibility of the sensor based on the message queue and the remaining battery level of the at least one sensor includes:
    estimating the communication possibility of the sensor based on whether a packet exists in the message queue and whether the remaining battery level is equal to or greater than a reference value required for transmission of the packet.

9. The mobile base station of claim 8, wherein the at least one sensor in the communicable range of the mobile base station corresponds to at least one of a first state, a second state and a third state, and the allocating of the resource to the sensor includes allocating, by the mobile base station, the resource to a sensor having a higher probability of corresponding to the second state than the first state and the third state.

10. The mobile base station of claim 9, wherein the resource allocation from the macro base station includes receiving the resource allocation from the macro base station based on a number of the at least one sensor corresponding to the second state in the communicable range and a signal strength by a macro user.

11. The mobile base station of claim 9, wherein the allocating of the resource to the sensor includes allocating the resource to the sensor having the highest probability of corresponding to the second state when there are a plurality of sensors having a higher probability of corresponding to the second state than the first state and the third state.

12. The mobile base station of claim 9, wherein the first state corresponds to a case in which the remaining battery level of the sensor is greater than or equal to a reference value but there are no packets in the message queue, the second state corresponds to a case in which the remaining battery level of the sensor is greater than or equal to the reference value and there exists a packet in the message queue, and the third state corresponds to a case in which the remaining battery level is less than the reference value regardless of the message queue.

13. The mobile base station of claim 8, wherein the estimating of the communication possibility of the sensor includes estimating the communication possibility based on a steady state probability based on a Markov chain and updating the communication possibility using different transition probabilities depending on whether a macro user communicates with the macro base station using the resource.

14. The mobile base station of claim 8, wherein the mobile base station detects a signal transmitted by a macro user every resource allocation period and updates the communication possibility of the sensor every resource allocation period.

15. A non-transitory computer readable medium having instructions stored thereon that, when executed by a processor, cause the processor to perform operations comprising:
    detecting at least one sensor within a communicable range of a mobile base station;
    estimating a communication possibility of the sensor based on a message queue and a remaining battery level of the at least one sensor;
    receiving resource allocation from a macro base station based on the communication possibility; and
    allocating the allocated resource to the sensor,
    wherein the estimating the communication possibility of the sensor based on the message queue and the remaining battery level of the at least one sensor includes:
    estimating the communication possibility of the sensor based on whether a packet exists in the message queue and whether the remaining battery level is equal to or greater than a reference value required for transmission of the packet.

* * * * *